(12) United States Patent
Livingston

(10) Patent No.: US 6,434,719 B1
(45) Date of Patent: Aug. 13, 2002

(54) ERROR CORRECTION USING RELIABILITY VALUES FOR DATA MATRIX

(75) Inventor: Jay Neil Livingston, Superior, CO (US)

(73) Assignee: Cirrus Logic Inc., Freemont, CA (US)

( * ) Notice: Subject to any disclaimer, the term of this patent is extended or adjusted under 35 U.S.C. 154(b) by 0 days.

(21) Appl. No.: 09/307,282

(22) Filed: May 7, 1999

(51) Int. Cl.$^7$ ................................................. G06F 11/00
(52) U.S. Cl. ........................................ 714/804; 714/799
(58) Field of Search ............................... 714/755, 796, 714/763, 712, 794, 795, 804, 799, 820, 821; 360/48

(56) References Cited

U.S. PATENT DOCUMENTS

| | | | |
|---|---|---|---|
| 4,653,051 A | * 3/1987 | Sugimura et al. | 714/755 |
| 5,170,400 A | * 12/1992 | Dotson | 714/755 |
| 5,291,499 A | * 3/1994 | Behrens et al. | 714/796 |
| 5,666,371 A | * 9/1997 | Purdham | 714/763 |
| 6,005,727 A | * 12/1999 | Behrens et al. | 360/48 |

OTHER PUBLICATIONS

Hagenauer and Hoeher, "A Viterbi Algorithm with Soft–Decision Outputs and Its Applications", Conference, Record, IEEE Global Telecommunications Conference & Exhibition, Dallas, Texas, Nov. 27–30, 1989, vol. 3, pp. 1680–1686.

L.R. Bahl et al., "Optimal Decoding of Linear Codes for Minimizing Symbol Error Rate", *IEEE Transactions On Information Theory*, Mar. 1974, pp. 284–287.

* cited by examiner

*Primary Examiner*—David Ton
(74) *Attorney, Agent, or Firm*—Nixon & Vanderhye, P.C.

(57) ABSTRACT

Erroneous column(s) in the matrix of data obtained from a transmission channel are first determined on the basis of column parity violation. An error instance in the matrix is next ascertained by matching the erroneous column(s) with an error event characteristic of the transmission channel. A candidate error row is then located in the matrix with respect to the error instance. Lastly, positions in the matrix specified by an intersection of the candidate error row and the erroneous column(s) of the error instance are corrected. Data reliability values assigned to positions of the matrix are used to determine the candidate error row. In particular, with respect to the erroneous column(s) of the error instance, and for each of plural rows of the matrix, factors (e.g., squares) of the reliability values assigned to positions of the matrix are summed to determine a least reliable row as the candidate error row. The operation of the invention is preferably preceded by a row error detection/correction operation which corrects single bit and tri-bit row errors in the matrix.

36 Claims, 9 Drawing Sheets

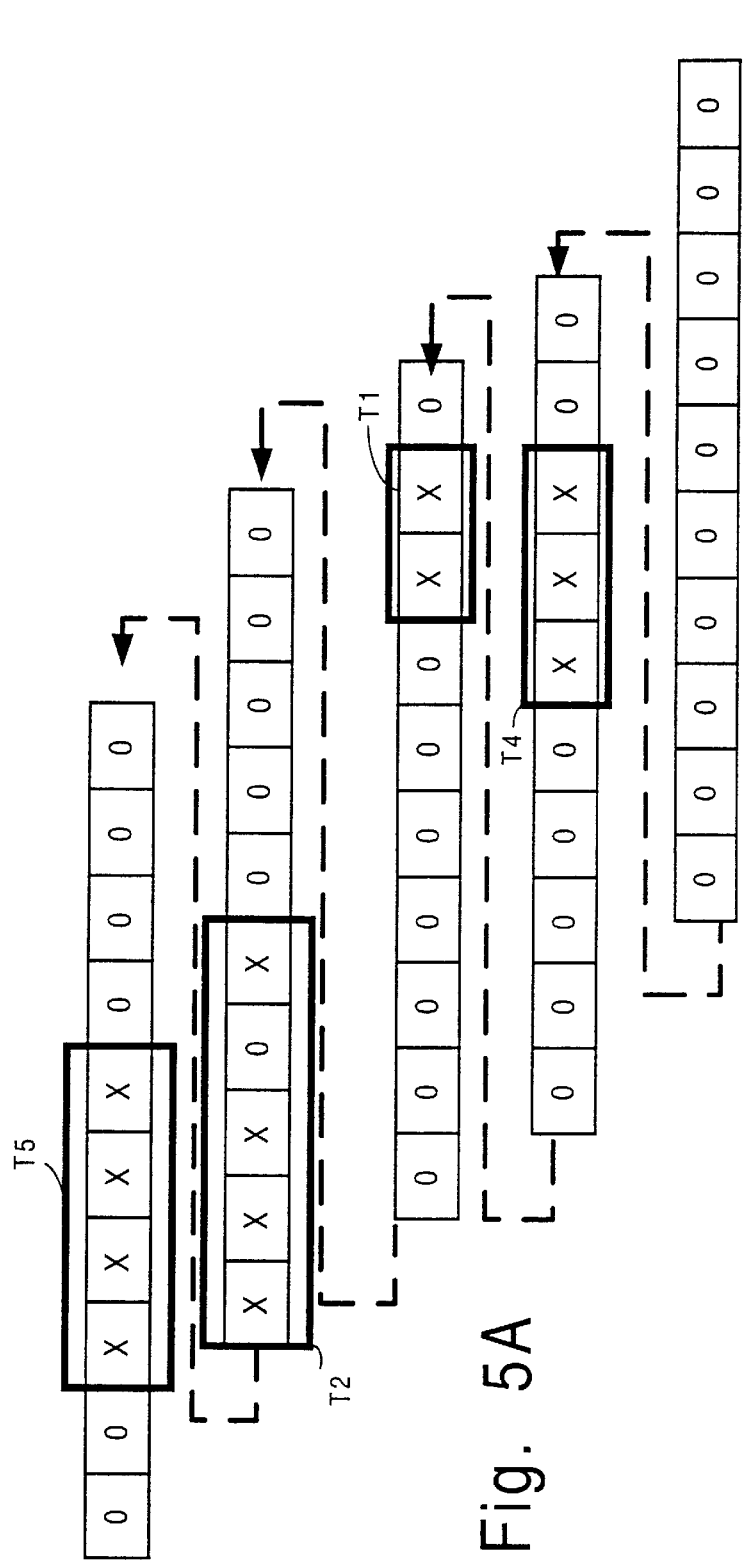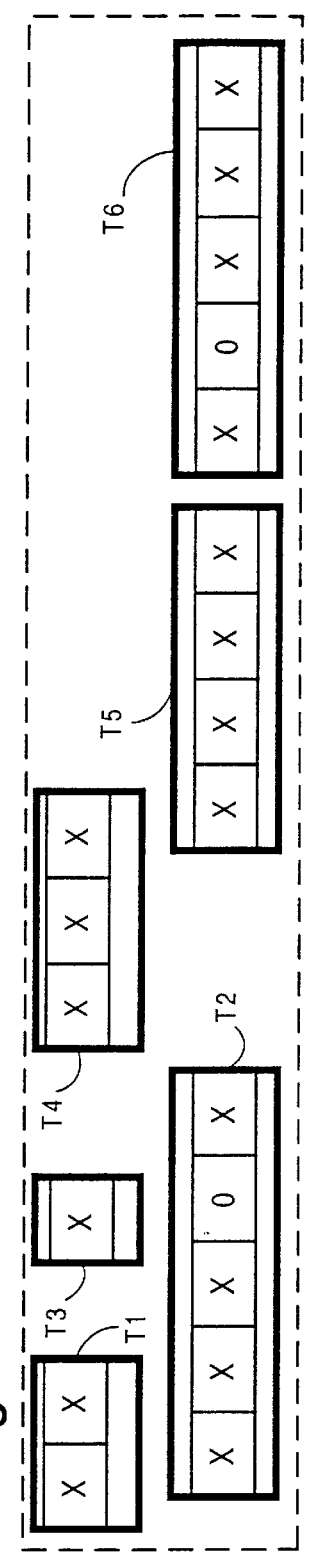
Fig. 5A
Fig. 6

ERROR CORRECTION USING RELIABILITY VALUES FOR DATA MATRIX

BACKGROUND

1. Field of the Invention

The present invention pertains to the correction of errors in a data stream such as that acquired from a storage medium, particularly when an estimate of reliability of the data is provided.

2. Related Art and Other Considerations

It is important that data be accurately transmissible from a source to a destination, since many operations depend upon the integrity of the data obtained from the source. Often the source of data utilized for a particular operation is a data storage medium and the destination is a computer or the like. The data storage medium can take various forms, such as a magnetic disk transduced by a magnetic disk drive or an optical disk transduced by an optical disk drive, for example.

On occasion the data may not be correctly read from the data storage medium or not correctly transmitted along a read channel of the drive to the destination. Fortunately, some apparatus that read or transmit data from a source to a destination, e.g., disk drives, have capabilities for attempting to detect and/or correct errors in the data stream from the source.

There is a substantial body of prior art directed to various techniques for error correction of data. Included in this body of prior art are numerous employments of "product codes" or two-dimensional codes. As used herein, "product codes" typically operate upon a matrix of data, with a first parity or code operation being performed upon a row of the matrix (horizontal) and a second parity or code operation being performed upon a column of the matrix (vertical). The horizontal and vertical codes may be employed in alternating sequence for resolving errors in the matrix.

It is known that some types of read channels are particular prone to suffer the prevalence of certain types of errors (e.g., single bits, tribits, etc.). In addition, various techniques have been introduced for obtaining a reliability estimate of data transmitted from a source to a destination. One such technique is referred to as the soft output Viterbi algorithm (SOVA), and is documented, e.g., by Hagenauer and Hoeher, "A Viterbi Algorithm with Soft-Decision Outputs and Its Applications", Conference Record, IEEE Global Telecommunications Conference & Exhibition, Dallas, Tex., Nov. 27–30, 1989, Vol. 3, pp. 1680–1686. The SOVA technique assigns a reliability value to each bit in the data stream. Other techniques for obtaining reliability estimates also exist, such as that referenced as the "BCJR" algorithm [L. R. Bahl et al., "Optimal Decoding of Linear Codes for Minimizing Symbol Error Rate", *IEEE Tranactions On Information Theory*, March 1974, pp. 284–287].

What is needed, and thus an object of the present invention, is an effective way to use reliability information in error detection/location schemes which operate upon a matrix.

BRIEF SUMMARY OF THE INVENTION

In accordance with method and apparatus of the present invention, data obtained from a transmission channel is conceptualized as a matrix. Erroneous column(s) in the matrix are first determined on the basis of column parity violation. An error instance in the matrix is next ascertained by matching the erroneous column(s) with an error event characteristic of the transmission channel. A candidate error row is then located in the matrix with respect to the error instance. Lastly, positions in the matrix specified by an intersection of the candidate error row and the erroneous column(s) of the error instance are corrected.

Data reliability values assigned to positions of the matrix are used to determine the candidate error row. In particular, with respect to the erroneous column(s) of the error instance, and for each of plural rows of the matrix, factors related to reliability values assigned to positions of the matrix are summed to determine a least reliable row as the candidate error row. In an illustrated embodiment, squares of the reliability values are summed to determine a least reliable row, the least reliable row having an extreme (e.g., smallest) sum.

In correcting the row of a matrix, the invention is careful not to correct in isolation an odd weight error instance (e.g., an error instance involving an odd number of columns), lest row parity be violated. To this end, when a candidate error row has been selected for an odd weight error instance, the invention presumes that another odd weight error instance also resides in the same row. The correction of two odd weight error instances in the same row therefore does not violate row parity.

Preferably the transmission channel is included in a disk drive, and is one of an EPR4 and $E^2PR4$ read channel. In the case of an EPR4 read channel, the error event characteristic of the transmission channel is one of (1) a di-bit error; (2) a tri-bit error, followed by one or more bits of no error, followed by a single bit error; (3) a single bit error; (4) a tri-bit error; and (5) a quad-bit error.

The operation of the invention is preferably preceded by a row error detection/correction operation which corrects single bit and tri-bit row errors in the matrix.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIG. 5A is a diagrammatic view depicting of the string of column parity results of FIG. 5, but additionally showing error event templates imposed thereupon.

FIG. 6 is a diagrammatic view showing a collection of read channel events in the form of templates.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention. However, it will be apparent to those skilled in the art that the present invention may be practiced in other embodiments that depart from these specific details. In other instances, detailed descriptions of well known devices, circuits, and methods are omitted so as not to obscure the description of the present invention with unnecessary detail.

Figure 1:
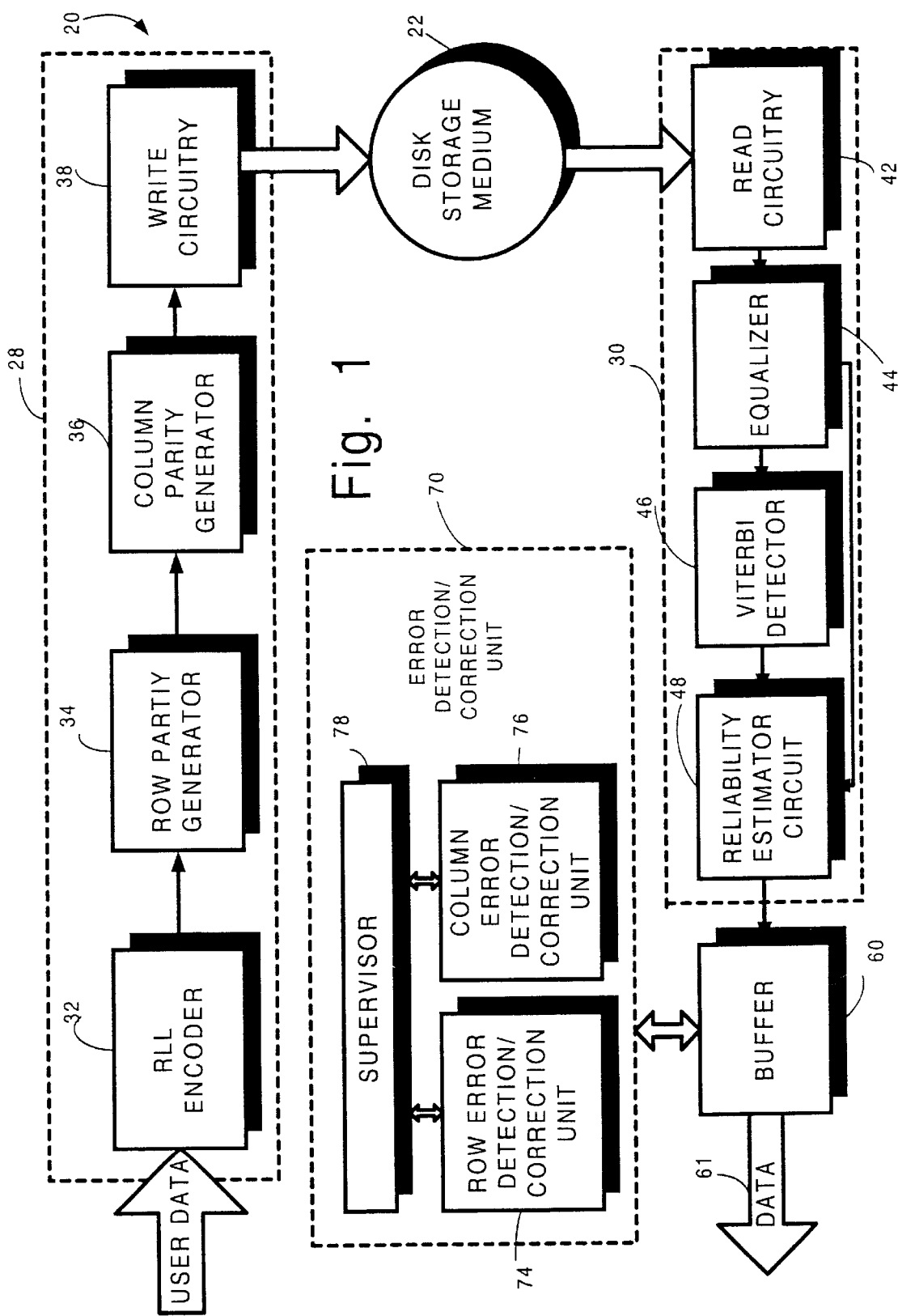
FIG. 1 is a schematic view of an example drive which incorporates an error detection and correction apparatus according to an embodiment of the invention.

FIG. 1 shows an illustrative environment for practicing the error correction process of the invention. The illustrative environment is shown as being portions of a disk drive 20 which records and reproduces signals recorded on disk storage medium 22 The disk drive 20 can either be an optical disk drive (in which case the disk storage medium 22 is an optical disk), or a magnetic disk drive (with disk storage medium 22 being a magnetic disk). Although these examples of rotating storage medium 22 are discussed for purposes of illustration, it should be understood that the invention is not confined for recovery/correction of errors obtained from a storage medium 22. Rather, the principles of the present invention can be utilized in any environment in which data checked or coded in matrix form is obtained from a channel, regardless of whether the data emanates from storage medium.

The present invention presupposes that data acquired from a transmission channel (such as a read channel) is conceptualized as being in matrix form. Further, it is presumed that rows of the matrix and columns of the matrix each have had a code or parity check operating thereon. In the example data matrix 26 shown in FIG. 2, each row comprises a block of fifty bits $b_{i,j}$ (beginning with row 1 and continuing through row n) and a horizontal (row) parity bit $pr_i$. The row parity bit $pr_i$ is computed over row i. Similarly, a column parity bit $pc_j$ is computed over each of the fifty one columns. In the illustrated embodiments, the row parity bits $pr_i$ and the column parity bits $pc_j$ are preferably even parity. As transmitted over the transmission channel in the manner shown in FIG. 2, each row of the matrix has one of the column parity bits $pc_j$ appended thereto. In the mode illustrated, first row $r_1$ has the parity bit $pc_1$ for the first column appended thereto, the second row $r_2$ has the parity bit $pc_2$ for the second column appended thereto, and so forth.

The example disk drive 20 of FIG. 1 has a write or recording channel 28 and a read or reproduction channel 30. The write channel 28 and read channel 30 transduce information formatted on disk storage medium 22 in the manner of FIG. 2. As shown in FIG. 1, in write channel 28 user data enters a run length encoder RRL 32. Fifty bit blocks of data are output from run length encoder RRL 32 to row parity generator 34 which generates the row parity values $pr_i$ (see FIG. 2). As an entire matrix of data is being assembled, column parity generator 36 computes the column parity values $pc_j$ for each of the columns of the matrix. The data from the matrix is then applied to write circuitry 38 for recording the matrix on disk storage medium 22.

Figure 2:
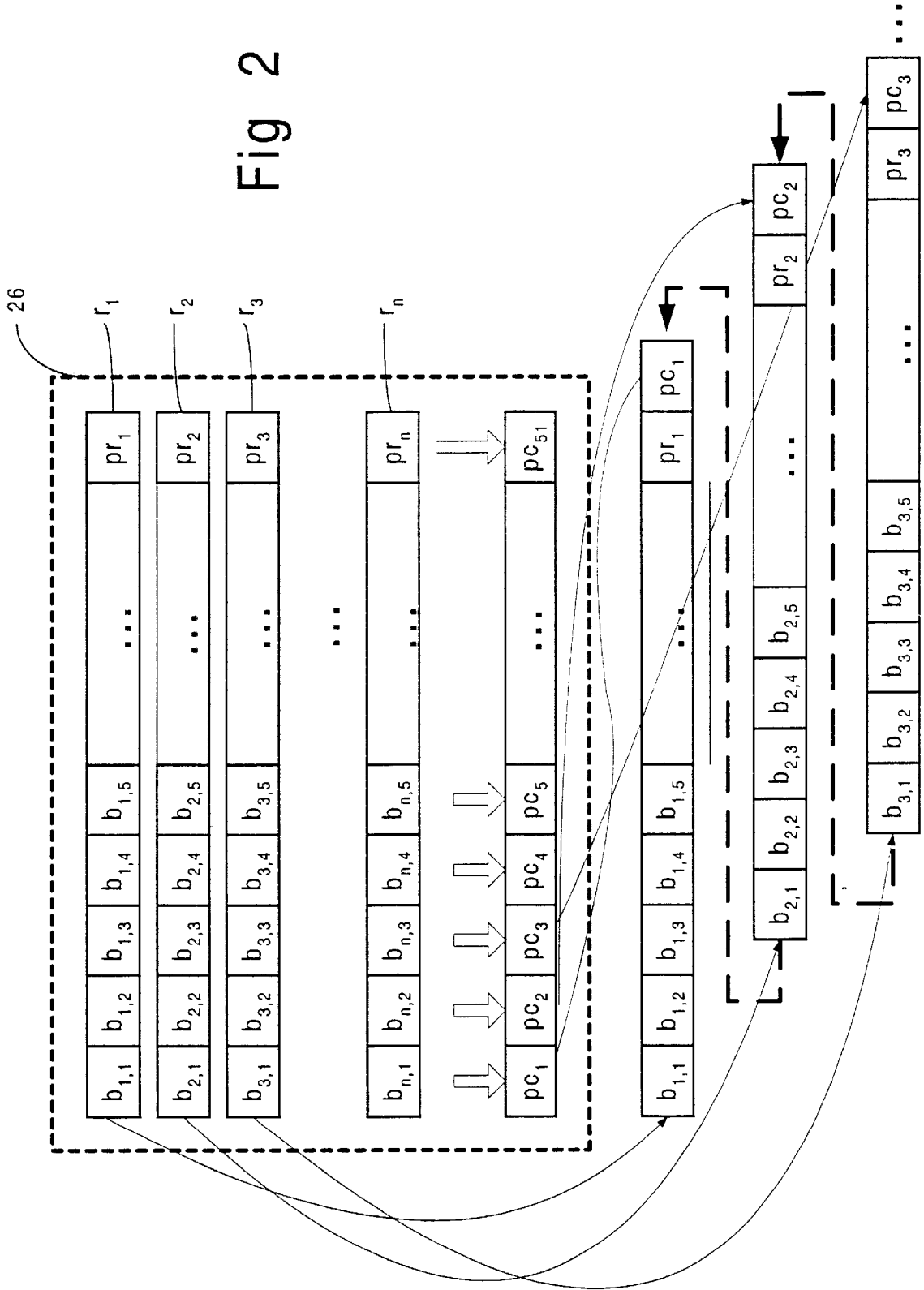
FIG. 2 is a diagrammatic view showing a format of data received by the apparatus of the present invention.

In read channel 30, the data on disk storage medium 22 is transduced by read circuitry 42 and applied to equalizer circuit 44, and from equalizer circuit 44 to Viterbi detector 46. The output of Viterbi detector 46, an estimate of the data, is applied to reliability estimator circuit 48. The reliability estimator circuit 48 compares the estimate of the data received from Viterbi detector 46 with what actually was read (from equalizer circuit 44), and outputs an estimate of reliability of the data to buffer 60. In the illustrated embodiment, buffer 60 is sized to store a half sector of information from disk 22. Information is stored in buffer 60 in matrix fashion as shown in FIG. 2.

For each position of a matrix stored in buffer 60, in the illustrated embodiment the reliability estimator circuit 48 supplies both a magnitude value and a sign value, as subsequently illustrated by FIG. 7. The sign value (plus or minus) reflects the actual data value; the magnitude value is a quantification of the reliability of the actual data value as determined by reliability estimator circuit 48. Details of the structure and operation of reliability estimator circuit 48 or "error metrics" are understood from simultaneously-filed U.S. patent application Ser. No. 09/307,645 filed May 7, 1999 entitled "A Sampler Amplitude Read Channel Employing a Trellis Sequence Detector and a Post Processor for Generating Error Metrics Used to Correct Errors Made by the Trellis Sequence Detector", which is incorporated herein by reference. It should be understood, however, that other techniques for providing a reliability estimation of data values can instead be employed, such as the soft output Viterbi algorithm (SOVA) or "BCJR" algorithm discussed above, or any other suitable reliability assignment scheme.

An error detection/correction unit 70 operates in two phases on a matrix of data stored in buffer 60. In a first phase, a row error detection/correction unit 74 detects and corrects any single bit errors or tri-bit errors in a row of the matrix. In a second phase, a column error detection/correction unit 76 uses column parity bits in order to detect and correct any further errors. The two phases of operation of error detection/correction unit 70 are coordinated by a supervisor or controller 78. After a matrix in buffer 60 is subjected to the two phases of operation of error detection/correction unit 70, user data of the matrix is transmitted to an unillustrated RLL decoder and an illustrated host device as indicated by arrow 61.

Figure 3:
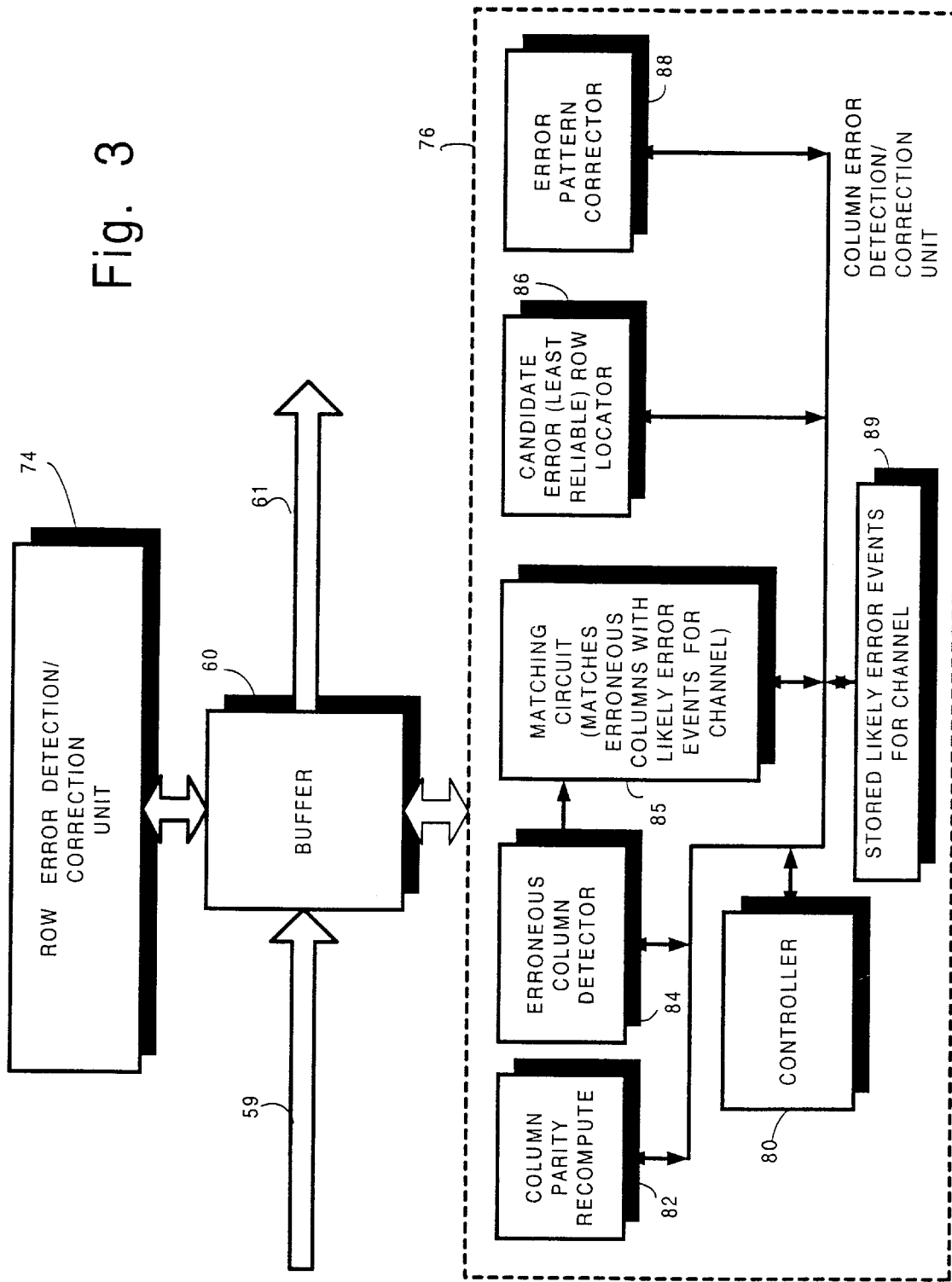
FIG. 3 is a schematic view of error detection/correction apparatus included in the embodiment of FIG. 1.

FIG. 3 shows (by arrow 59) a matrix being stored in buffer 60. As indicated above, in the first phase of operation of error detection/correction unit 70, row error detection/correction unit 74 operates upon the matrix in buffer 60 and corrects any single bit errors or tri-bit errors in a row of the matrix. The structure and operation of an example row error detection/correction unit 74 is understood from U.S. patent application Ser. No. 09/204,758 entitled "Sampled Amplitude Read Channel Employing Noise Whitening in a Remod/Demod Sequence Detector", which is incorporated herein by reference. However, other types of errors may yet remain in the matrix in buffer 60, for which reason supervisor 78 of error detection/correction unit 70 next summons the second phase involving column error detection/correction unit 76.

Structural and operational aspects of column error detection/correction unit 76 are also shown in FIG. 3. The column error detection/correction unit 76 comprises a controller 80 which coordinates and sequences the operation of the constituent units of column error detection/correction unit 76. Those constituent units include column parity recompute unit 82; erroneous column detector 84; matching circuit 85; candidate error (least reliable) row locator 86; and error pattern corrector 88. In addition, column error detection/correction unit 76 includes a memory 89 wherein are stored likely error events for the read channel 30.

Figure 4:
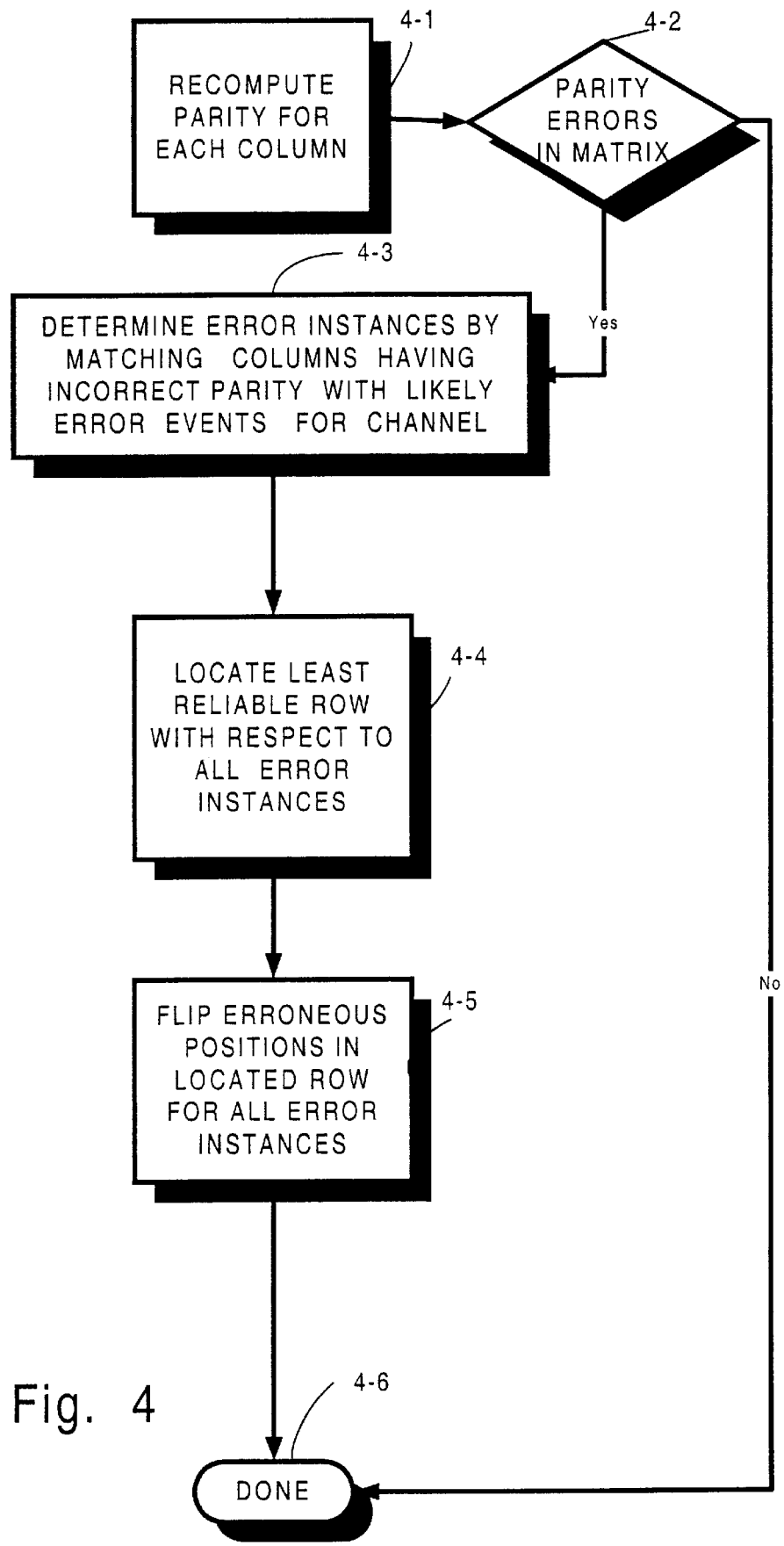
FIG. 4 is a flowchart showing basic steps performed by the apparatus of FIG. 3 in connection with the location and correction of errors in accordance with a mode of the invention.

Operation of column error detection/correction unit 76 with respect to a matrix in buffer 60 is depicted by the basic steps illustrated in FIG. 4. At step 4-1, the column parity recompute unit 82 recomputes the parity for each row of the matrix. The parity is recomputed since any correction implemented by row error detection/correction unit 74 may have resulted in a change to the matrix which affects column parity. Therefore, at step 4-1 the column parity recompute unit 82 recomputes, for each column j, a column parity p'$c_j$ using the user data values $b_{1,j}$ through $b_{n,j}$ in column j. The notation p'$c_j$ is employed for the recomputed column parity, so as to differentiate over the column parity p$c_j$ that was computed prior to recording and actually recorded on the disk. Moreover, it is to be kept in mind that (in the illustrated embodiment that employs the reliability estimator circuit 48 herein exemplified) the actual data values as stored in buffer 60 are derived from the signs (plus or minus) for each position in the matrix.

After the column parity is recomputed at step 4-1, at step 4-2 the erroneous column detector 84 determines whether any of the columns j of the matrix have an incorrect parity (e.g., p'$c_j$ is odd rather than even). If none of the columns have incorrect parity, there is no need for error detection/correction unit 70 to take further action. Accordingly, as indicated by step 4-6, processing by error detection/correction unit 70 is completed and the matrix can be outputted from buffer 60 as indicated by arrow 61.

Figure 5:
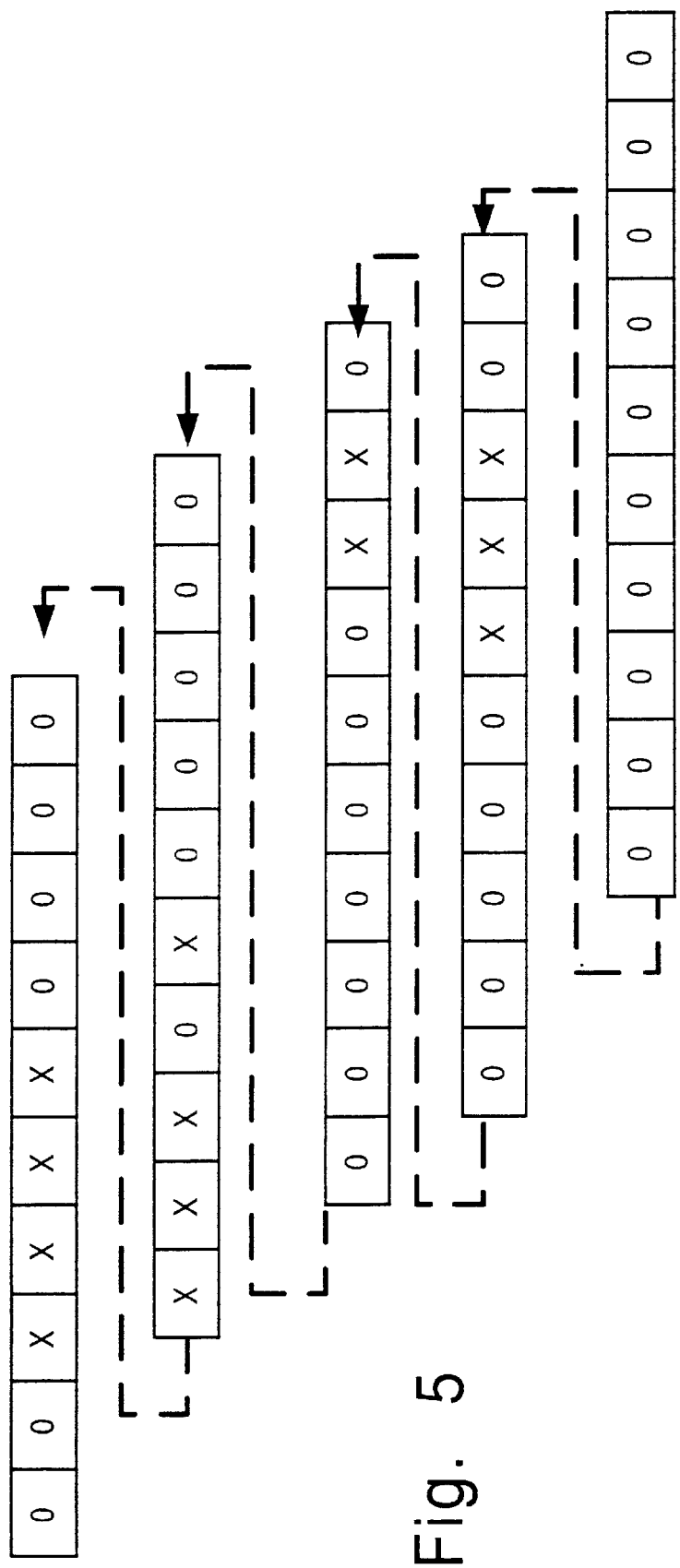
FIG. 5 is a diagrammatic view depicting a string of column parity results for a matrix.

If it is determined at step 4-2 that column parity errors reside in the matrix in buffer 60, the erroneous column detector 84 advises the matching circuit 85 of the particular columns having incorrect parity. Suppose (for example) that erroneous column detector 84 determined, for a given matrix in buffer 60, that column parity violations occurred in columns 3–6, 11–13, 15, 28, 29, and 36–38. Such situation is illustrated in FIG. 5, wherein each box represents one of the fifty columns of the matrix with a "X" depicting a column with a parity error violation and "0" depicting a column with proper parity. The fact that column parity violations occurred in columns 3–6, 11–13, 15, 28, 29, and 36–38 is communicated to matching circuit 85, so that matching circuit 85 can conduct a matching operation which is described below in connection with step 4-3.

At step 4-3, matching circuit 85 develops a list of error instances for the matrix. The list of error instances is developed by attempting to match the columns of the matrix having incorrect parity with certain likely error events for the particular read channel involved in the disk drive. The likely error events for the channel are prestored in memory 89, and are based on historical observation of the same or similar read channels. For example, in the illustrated embodiment wherein read channel 30 is a EPR4 read channel, the most likely error events are (1) a di-bit error; (2) a tri-bit error separated by one or more bits of no error followed by a single bit error; (3) a single bit error; (4) a tri-bit error; and (5) a quad-bit error. Thus, in a sense, memory 89 has a collection of likely error event templates. In FIG. 6, each template or likely error event is illustrated as a string of bit positions, with an error bit being indicated by an X and one or more no-error bits is indicated by a O. The first error event or first template T1 in the table of FIG. 5 thus corresponds to the di-bit error (two consecutive bit errors in a row); the second error event or second template T2 corresponds to the tri-bit error, followed by no error, followed by a single bit error [XXXOX]; and so forth. It should be understood that there can be differing versions of the second template T2, in that the number of no error bits between the tri-bit error and the single bit error can vary.

For the example matrix having column parity evaluations as reflected by FIG. 5, at step 4-3 the list of error instances developed by matching circuit 85 is shown in Table 1.

TABLE 1

LIST OF ERROR INSTANCES

| Error Instance Number | Columns Involved in Error Instance | Matching Template (from likely error events for channel) |
|---|---|---|
| 1 | 3–6 | T5 |
| 2 | 11–13, 15 | T2 |
| 3 | 28–29 | T1 |
| 4 | 36–38 | T4 |

As seen from Table 1, matching circuit 85 develops the list of error instances by matching columns with parity violations with the templates of likely error events as stored in memory 89, e.g., the templates T1–T6–shown in FIG. 6. FIG. 5A illustrates visually the matching of the templates T1–T2 and T4–T5 to the columns having column parity violations. For example, the first error instance occurring in columns 3–6 is seen to match with template T5; the second error instance occurring in columns 11–13 and 15 matches with template T2, and so forth.

The particular example of FIG. 5 and FIG. 5A just so happens to include error instances corresponding to four of the illustrated templates (templates T1–T2 and T4–T5) of FIG. 6. It should be understood, however, that the columnar parity results for a given matrix can have matches with one or more templates T1–T6, and that the same template may apply for more than two error instances in the same matrix. Moreover, not all of the templates T1–T6 may be applicable for a given matrix, but rather a subset of the templates may be utilized for matching. If an error instance is unmatchable with one of the error events reflected by the templates stored in memory 89, the column error detection/correction unit 76 declares the matrix to be uncorrectable.

With the error instances matched with error events in the example manner shown in FIG. 5A, the challenge for column error detection/correction unit 76 then becomes (at step 4-4) determining which row of the matrix caused the column parity violation for each error instance, i.e., which row sustained the likely error event of the channel. The job of locating the row of the matrix that caused the column parity violation for each error instance falls to candidate error (least reliable) row locator 86.

Figure 8:
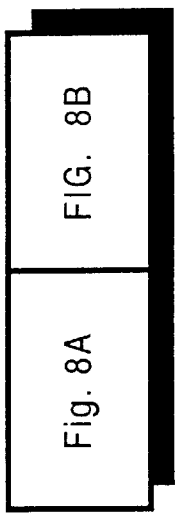
FIG. 8 is a diagrammatic view showing a relationship of FIG. 8A and FIG. 8B.
Figure 8A:
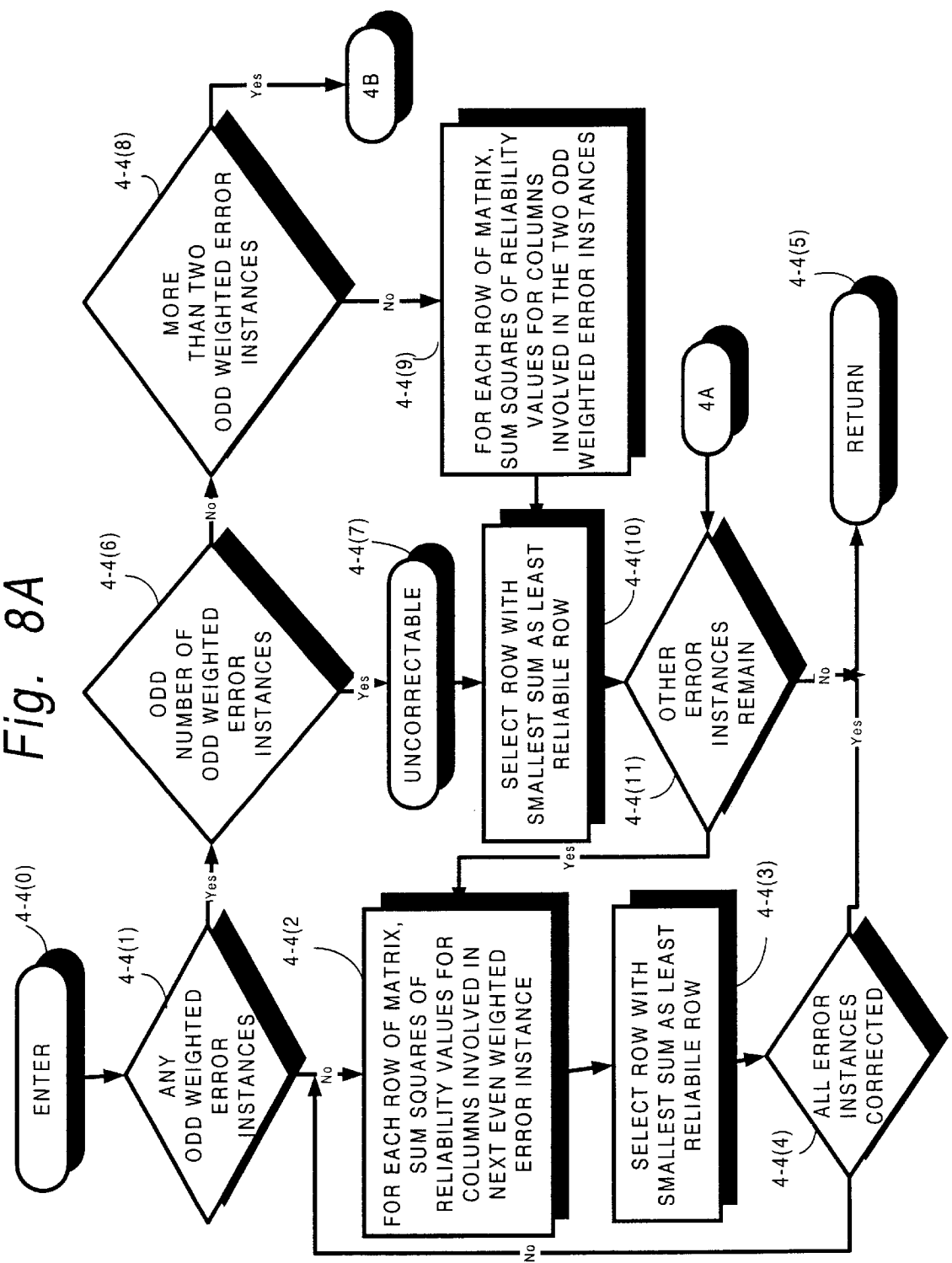
FIG. 8A and FIG. 8B are flowcharts showing sub-steps of a step of FIG. 4.
Figure 8B:
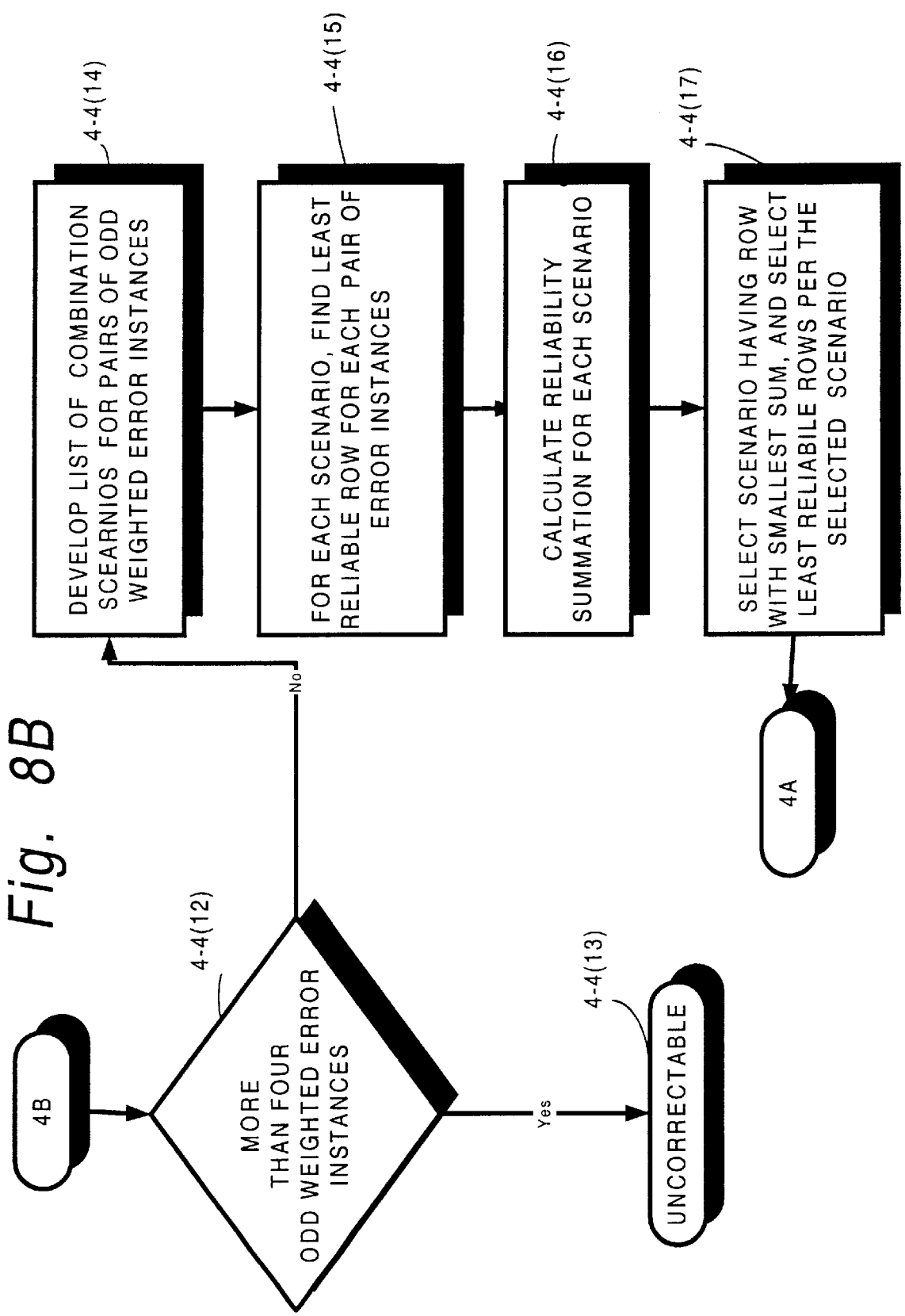

Sub-steps involved in the location of a candidate error (e.g., least reliable) row by candidate error (least reliable) row locator 86, i.e., sub-steps of step 4-4, are illustrated in FIG. 8A and FIG. 8B, and are discussed below. The candidate error row locate routine of FIG. 8A is entered at step 4-4(0). At step 4-4(1), the candidate error (least reliable) row locator 86 determines whether there are any odd weight error instances. If there are no odd weight error instances, the candidate error (least reliable) row locator 86 handles the even weight error instances one at a time, by performing for each such even weight instance a loop comprising step 4-4(2) through step 4-4(4).

At step 4-4(2), in connection with the next even weighted error instance, for each row of the matrix, candidate error row locator 86 sums the squares of the reliability values for matrix positions (e.g., columns) involved in the error instance. The summation of squares, for each row, of matrix positions involved in the matrix is illustrated with respect to FIG. 7 for the first error instance of FIG. 5A. In particular, FIG. 7 shows example contents of portions of a matrix in buffer 60 for which column parity violations were found (by erroneous column detector 84) in columns 3–6. As previously mentioned, the values stored in buffer 60 by reliability estimator circuit 48 have both a sign and a magnitude. The sign of each position in the matrix corresponds to the actual user data value (e.g., a "+" sign representing a digital "1" value and a "−" sign representing a digital "0" value, for example). The magnitude of each position in the matrix is the reliability estimate regarding the user data value. The greater the magnitude of the reliability estimate, the greater the perceived reliability of the corresponding user data value. In FIG. 7 only the first three rows of the matrix in buffer 60 are shown for sake of simplicity.

As indicated before, at step 4-3 the matching circuit 85 determined that the first error instance in columns 3–6 matched the error event of template T1 (see FIG.6). Thus, at step 4-4(2), candidate error row locator 86 sums the squares of columns 3–6 for each row of the matrix. The resultant sum of the first row of the matrix of FIG. 7 is 135 ($5^2+5^2+6^2+7^2$); the resultant sum of the second row of the matrix of FIG. 7 is 7 ($1^2+2^2+1^2+1^2$); the resultant sum of the third row of the matrix of FIG. 7 is 215 ($7^2+6^2+7^2+9^2$). Similar summations occur for each row of the matrix, involving only the positions of the error instance (e.g., columns 3–6 in FIG. 7).

At sub-step 4-4(3) the candidate error row locator 86 selects, as the least reliable row, the row which at sub-step 4-4(2) was computed to have the smallest sum. In the example of FIG. 7, considering only the first three rows, the second row is selected as the least reliable row since the second row has the smallest summation as determined at sub-step 4-4(2). The row selected as the least reliable row is thus associated by candidate error row locator 86 with the first even weight error instance.

Any successive even weight error instances are handled in like manner as described above, until it is determined at step 4-4(4) that all least reliable rows have been determined for each of the even weight error instances. When all even weight error instances have been processed, the candidate error row locator 86 finishes with its processing and returns to column error detection/correction unit 76 as indicated by step 4-4(5).

If is determined at step 4-4(1) that there is at least one error instance which is odd weighted, the candidate error row locator 86 checks at step 4-4(6) whether there are an odd number of odd weighted error instances. If there are an odd number of odd weighted error instances, candidate error (least reliable) row locator 86 concludes that the matrix is uncorrectable (step 4-4(7)). On the other hand, if it is determined at step 4-4(6) that there are an even number of odd weighted error instances, the candidate error row locator 86 checks at step 4-4(8) whether there are more than two odd weight instances. If t here are only two odd weight instances, at step 4-4(9) candidate error row locator 86 presumes that the two odd weighted error instances occurred on the same row of the matrix.

For a situation in which there are only two odd weight instances, candidate error row locator 86 performs at step 4-4(9) and 4-4(10) operations which are analogous to those performed at step 4-4(2) and 4-4(3), respectively. However, in performing step 4-4(9) and 4-4(10), candidate error row locator 86 presumes that the two odd weight error instance s occurred on the same row, so that for each row of the matrix a summation occurs for squares of the reliability values for columns involved in both templates (e.g., both odd weighted error instances). As a result of performance of step 4-4(10), one row is selected as the least reliable row with respect to both of the odd weighted error instances.

After location of the least reliable row for the two odd weighted error instances, a check is made at step 4-4(11) whether other error instances (e.g., even weight error instances) remain for processing. If so, the loop comprising step 4-4(2) through 4-4(4) is performed as m any times as necessary depending on the number of such even weight error instances. If not, the candidate error row locator 86 concludes it s operation as indicated by step 4-4(5).

If it is determined that more than two odd weighted error instances exists, at check is made at step 4-4(12) [see FIG. 8B] whether more than four odd weighted error instances exist. If more than four odd weighted error instances have occurred, the matrix is considered uncorrectable as indicated by step 4-4(13). If four odd weighted error instances exist, step 4-4(14) through step 4-4(17) are performed. At step 4-4(14), candidate error row locator 86 develops a list of combination scenarios for pairs of odd weigh ted error instances. For example, with four odd weighted error instances Instance-A, Instance-B, Instance-C, and Instance-D, three combination scenarios exist:

Scenario 1: (1) Instance-A and Instance-B are combined on the same row, and (2) Instance-C and Instance-D are combined on the same row.

Scenario 2: (1) Instance-A and Instance-C are combined on the same row, and (2) Instance-B and Instance-D are combined on the same row.

Scenario 3: (1) Instance-A and Instance-D are combined on the same row, and (2) Instance-B and Instance-C are combined on the same row.

Step 4-4(15) involves, for each scenario, finding the least reliable row for each pair of error instances. For example, for Scenario 1 at step 4-4(15) candidate error row locator 86 would find the least reliable row for the pairing of Instance-A and Instance-B, as well as the least reliable row for the pairing of Instance-C and Instance-D. Finding the least reliable row at step 4-4(15) involves a summation of the squares of the reliability values for the error bits involved in the error instances, as understood with reference to foregoing steps such as step 4-4(2). Location of the least reliable row for the pairs of the other scenarios occurs in similar fashion.

At step 4-4(16) candidate error row locator 86 sums the reliability values for each scenario. For example, for Scenario A candidate error row locator 86 sums the squares of the relability values of (1) the columns involved Instance-A and Instance-B in the least reliable row determined for the pairing of Instance-A and Instance-B; and (2) the columns involved Instance-C and Instance-D in the least reliable row determined for the pairing of Instance-C and Instance-D. A similar summation is also calculated for Scenario 2 and Scenario 3 in accordance with the pairings of those scenarios.

At step 4-4(17) candidate error row locator 86 selects the scenario having the smallest sum as determined at step 4-4(16), and accordingly selects the least reliable rows for the four odd weighted error instances in accordance with the selected scenario. Upon completion of processing of the odd weighted error instances, candidate error row locator 86 returns to step 4-4(11) [see FIG. 4A] to check if other error instances (e.g., even weight error instances) remain for processing.

Concerning odd weighted error instances, in the example of the matrix of FIG. 5A there are two odd weight error instances, so that the determination at step 4-8 will be negative, and step 4-4(9) and 4-4(10) will be performed. Thus, candidate error(least reliable) row locator 86 will pair the odd weight error instance matched with template T4 with the odd weight error instance matched with template T2, and will treat these two odd weighted error instances as occurring in the same row of the matrix.

After candidate error row locator 86 has located the least reliable row for each error instance (or each pair of odd weighted error instances), at step 4-5 [FIG. 4 ] the row corrector 88 flips the user data values for each least reliable row for the matrix positions (e.g., columns) involved in the respective error instance(s). For example, if the user data values for positions 3–6 corresponded to 1,1,0,1, respectively, row corrector 88 would change the user data values to 0,0,1,0 at step 4-5.

Upon correction of all error instances, the column error detection/correction unit 76 has completed its operation (as indicated by step 4-6). The corrected matrix can then be transferred from buffer 60 to, e.g., a suitable host or receiving unit, as indicated by arrow 61.

As understood from the foregoing, for each error instance in the matrix, the row corrector 88 essentially corrects positions in the matrix specified by an intersection of the candidate error row (e.g., the least reliable row as determined at step 4-5) and the erroneous column(s) of the error instance.

As indicated above, at step 4-4(1) candidate error row locator 86 checks to determine if any error instance has an odd weight, e.g., affects an odd number of columns. If it is determined at step 4-4(1) that any error instance has an odd weight, the row corrector 88 realizes that correcting an odd number of columns in the least reliable row for that odd weighted error instance alone would result in a row parity error for that row. Consider, for example, the situation that occurs for error instance 2 in Table 1 (see template T2 in FIG. 6), which has odd parity. When a least reliable row is located for error instance 2, the flipping of the five bits corresponding to the error event will lead to a row parity violation. Therefore, the present invention pairs odd weighted error instances so that a pair of odd weighted error instances are presumed to have occurred on the same least reliable row. For example, with respect to the matrix of FIG. 5A, the row corrector 88 will conclude that the error instance matched with template T4 (an odd weight error instance) occurred in the same row as the row determined to be least reliable for the second error instance (matched with template T2 in FIG. 5A). In this manner, row parity can be maintained when the column positions of the row are flipped at positions of the row are flipped at step 4-5.

Figure 7:
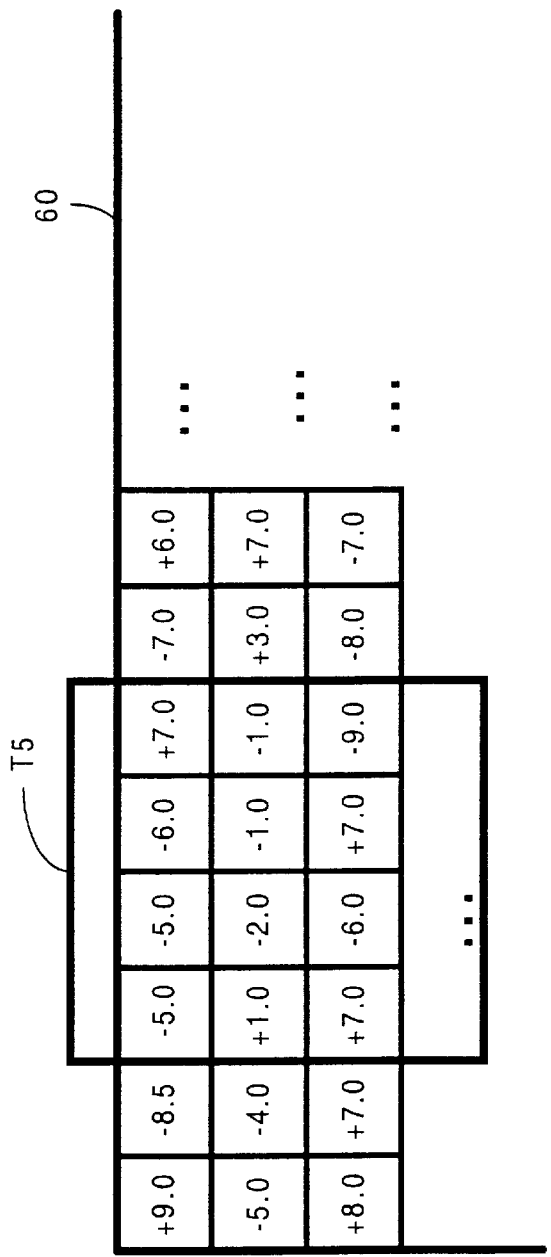
FIG. 7 is a diagrammatic view of a portion of an example matrix of data for the purpose of illustrating operation of aspects of the detection and correction apparatus incorporated in the example drive of FIG. 1.

It should be understood that the values provide in the example matrix of FIG. 7 are illustrative only. The magnitudes of such values need not be rounded to whole numbers as shown, and can be of a differing range than that shown.

In the foregoing illustration, the candidate error row locator 86 has preferably located the candidate error row by looking for the least reliable row in terms of data reliability as determined by reliability estimator circuit 48. It should be understood that, in other embodiments and modes of the invention, the candidate error row can be located according to other criteria. For example, information regarding correction and/or miscorrection operations performed by row error detection/correction unit 74 may be utilized in selecting a candidate error row.

While the column error detection/correction unit 76 can take the form of discrete elements as shown in FIG. 3, it should be understood that one or more of these elements can be combined in a single circuit, or that functions of the illustrated elements can be distributed among plural circuits. Moreover, if desired the functions performed by error location and correction circuit 70 and column error detection/correction unit 76 in particular can be executed by a processor (such as a microprocessor) having sufficient processing speed.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims. For example, memory 89 can be a separate memory as shown in FIG. 3, or included in another component such as matching circuit 85, for example.

What is claimed is:

1. A method of processing data obtained from a transmission channel, the data obtained from the transmission channel being conceptualized as a matrix, the method comprising:
   (1) determining erroneous column(s) in the matrix on the basis of column parity violation;
   (2) ascertaining an error instance in the matrix by matching the erroneous column(s) with an error event characteristic of the transmission channel;
   (3) locating a candidate error row in the matrix with respect to the error instance;
   (4) correcting positions in the matrix specified by an intersection of the candidate error row and the erroneous column(s) of the error instance.

2. The method of claim 1, wherein step (3) further comprises using data reliability values assigned to positions of the matrix to determine the candidate error row.

3. The method of claim 1, wherein step (3) comprises, with respect to the erroneous column(s) of the error instance, for each of plural rows of the matrix summing factors related to reliability values assigned to positions of the matrix.

4. The method of claim 3, further comprising using the row with an extreme sum as the candidate error row.

5. The method of claim 3, wherein the factors are squares of the reliability values.

6. The method of claim 1, wherein step (4) further comprises correcting the candidate error row additionally to correct a further error instance if a first error instance has an odd weight.

7. The method of claim 1, wherein the transmission channel is included in a disk drive.

8. The method of claim 7, wherein the transmission channel is one of an EPR4 and $E^2PR4$ read channel.

9. The method of claim 1, wherein the error event characteristic of the transmission channel is one of (1) a di-bit error; (2) a tri-bit error, followed by one or more bits of no error, followed by a single bit error; (3) a single bit error; (4) a tri-bit error; and (5) a quad-bit error.

10. The method of claim 1, further comprising, prior to step (1), correcting predetermined types of row errors in the matrix.

11. The method of claim 1, further comprising, prior to step (1), correcting single bit and tri-bit row errors in the matrix.

12. Apparatus for processing data obtained from a transmission channel, the data obtained from the transmission channel being conceptualized as a matrix, the apparatus comprising:
   means for determining erroneous column(s) in the matrix on the basis of column parity violation;

means for ascertaining an error instance in the matrix by matching the erroneous column(s) with an error event characteristic of the transmission channel;

means for locating a candidate error row in the matrix with respect to the error instance;

means for correcting positions in the matrix specified by an intersection of the candidate error row and the erroneous column(s) of the error instance.

13. The apparatus of claim 12, wherein the means for locating a candidate error row uses data reliability values assigned to positions of the matrix to determine the candidate error row.

14. The apparatus of claim 12, wherein the means for locating a candidate error row step (3) comprises, with respect to the erroneous column(s) of the error instance, for each of plural rows of the matrix sums factors related to reliability values assigned to positions of the matrix.

15. The apparatus of claim 14, wherein the factors are squares of the reliability values.

16. The apparatus of claim 14, wherein the means for locating a candidate error row uses the row with an extreme sum as the candidate error row.

17. The apparatus of claim 12, wherein the means for correcting corrects the candidate error row additionally to correct a further error instance if a first error instance has an odd weight.

18. The apparatus of claim 12, wherein the transmission channel is included in a disk drive.

19. The apparatus of claim 18, wherein the transmission channel is one of an EPR4 and $E^2PR4$ read channel.

20. The apparatus of claim 12, wherein the error event characteristic of the transmission channel is one of (1) a di-bit error; (2) a tri-bit error, followed by one or more bits of no error, followed by a single bit error; (3) a single bit error; (4) a tri-bit error; and (5) a quad-bit error.

21. The apparatus of claim 12, further means for correcting predetermined types of row errors in the matrix.

22. The apparatus of claim 12, further comprising means for correcting single bit and tri-bit row errors in the matrix.

23. The apparatus of claim 12, wherein the transmission channel is included in a disk drive.

24. Apparatus for processing data obtained from a transmission channel, the data obtained from the transmission channel being conceptualized as a matrix, the apparatus comprising a column error detection/correction unit which locates an error in the matrix at an intersection of an error candidate row and an error instance, the error instance being determined by a matching of (1) erroneous column(s) in the matrix as ascertained on the basis of column parity violation, and (2) an error event characteristic of the transmission channel.

25. The apparatus of claim 24, wherein the column error detection/correction unit corrects the error located at the intersection in the matrix.

26. The apparatus of claim 24, wherein the column error detection/correction unit locates a candidate error row using data reliability values assigned to positions of the matrix.

27. The apparatus of claim 24, wherein the column error detection/correction unit locates a candidate error row by summing factors related to data reliability values assigned to positions of the matrix.

28. The apparatus of claim 27, wherein the factors are squares of the reliability values.

29. The apparatus of claim 27, wherein the column error detection/correction unit selects a row with an extreme sum as the candidate error row.

30. The apparatus of claim 24, wherein the column error detection/correction unit corrects the candidate error row additionally to correct a further error instance if a first error instance has an odd weight.

31. The apparatus of claim 24, wherein the transmission channel is included in a disk drive.

32. The apparatus of claim 24, wherein the transmission channel is one of an EPR4 and $E^2PR4$ read channel.

33. The apparatus of claim 24, wherein the error event characteristic of the transmission channel is one of (1) a di-bit error; (2) a tri-bit error, followed by one or more bits of no error, followed by a single bit error; (3) a single bit error; (4) a tri-bit error; and (5) a quad-bit error.

34. The apparatus of claim 24, further comprising a row error detection/correction unit for correcting predetermined types of row errors in the matrix.

35. The apparatus of claim 24, further comprising a row error detection/correction unit for correcting single bit and tri-bit row errors in the matrix.

36. The apparatus of claim 24, wherein the transmission channel is included in a disk drive.

* * * * *